United States Patent
Mushikabe et al.

(10) Patent No.: US 11,163,525 B2
(45) Date of Patent: Nov. 2, 2021

(54) AUDIO SYSTEM CONSTRUCTION METHOD, INFORMATION CONTROL DEVICE, AND AUDIO SYSTEM

(71) Applicant: Yamaha Corporation, Shizuoka (JP)

(72) Inventors: Kazuya Mushikabe, Shizuoka (JP); Keisuke Tsukada, Shizuoka (JP); Keita Suzuki, Shizuoka (JP)

(73) Assignee: YAMAHA CORPORATION, Shizuoka (JP)

(*) Notice: Subject to any disclaimer, the term of this patent is extended or adjusted under 35 U.S.C. 154(b) by 0 days.

(21) Appl. No.: 16/828,849

(22) Filed: Mar. 24, 2020

(65) Prior Publication Data

US 2021/0141596 A1 May 13, 2021

Related U.S. Application Data

(60) Provisional application No. 62/931,955, filed on Nov. 7, 2019.

(51) Int. Cl.
| | |
|---|---|
| *G06F 3/16* | (2006.01) |
| *H04R 5/04* | (2006.01) |
| *H04R 3/12* | (2006.01) |

(52) U.S. Cl.
CPC .............. *G06F 3/167* (2013.01); *G06F 3/165* (2013.01); *H04R 3/12* (2013.01); *H04R 5/04* (2013.01); *H04R 2420/07* (2013.01)

(58) Field of Classification Search
CPC ........... G06F 3/167; G06F 3/165; H04R 3/12; H04R 5/04; H04R 2420/07
See application file for complete search history.

(56) References Cited

U.S. PATENT DOCUMENTS

| | | | | |
|---|---|---|---|---|
| 2012/0058727 | A1* | 3/2012 | Cook ...................... | H04R 3/00 455/41.3 |
| 2014/0226834 | A1 | 8/2014 | Kallai et al. | |
| 2015/0256957 | A1* | 9/2015 | Kim ......................... | H04R 3/12 381/303 |
| 2017/0317877 | A1* | 11/2017 | Rajapakse ............... | H04L 65/60 |
| 2018/0316731 | A1* | 11/2018 | Law ...................... | H04L 65/103 |
| 2021/0068173 | A1* | 3/2021 | Yore .................. | G06F 3/04883 |

OTHER PUBLICATIONS

Schoon, Google Home, Home Mini now support stereo speaker pairing, Oct. 28, 2019, 9TO5Google (Year: 2019).*

* cited by examiner

*Primary Examiner* — Fan S Tsang
*Assistant Examiner* — David Siegel
(74) *Attorney, Agent, or Firm* — Global IP Counselors, LLP

(57) ABSTRACT

An audio system construction method includes acquiring device information of a speaker by communication between an information control device and the speaker, setting a name of the speaker, and assigning, at the information control device, the speaker to a channel that plays a specific role related to the name of the speaker in an audio system that handles a plurality of channels.

20 Claims, 12 Drawing Sheets

| IP ADDRESS | NAME |
|---|---|
| 192.168.001.100 | Left Speker |
| 192.168.001.101 | Right Speaker |
| 192.168.001.102 | Subwoofer |

FIG. 4

| IP ADDRESS | NAME | CHANNEL |
|---|---|---|
| 192.168.001.100 | Left Speker | SL CHANNEL |
| 192.168.001.101 | Right Speaker | SR CHANNEL |
| 192.168.001.102 | Subwoofer | Subwoofer |

FIG. 5

AUDIO SYSTEM CONSTRUCTION METHOD, INFORMATION CONTROL DEVICE, AND AUDIO SYSTEM

CROSS-REFERENCE TO RELATED APPLICATIONS

This application claims the benefit of U.S. Provisional Application No. 62/931,955, filed on Nov. 7, 2019. The entire disclosure of U.S. Provisional Application No. 62/931,955 is hereby incorporated herein by reference.

BACKGROUND

Technical Field

One embodiment of the present invention relates to the assignment of speaker channels for the construction of an audio system.

Background Information

US Patent No. US2014/0226834 discloses an audio system in which two playback devices are paired for the construction of multichannel audio reproduction. In this audio system, a user operates a control terminal to set the pairing of two speakers.

SUMMARY

During the construction of an audio system, it is necessary that the user carry out a channel assignment operation by selecting which speaker to assign to which channel for each of a plurality of speakers.

An object of one embodiment of this disclosure is to reduce operations performed by the user during the construction of an audio system.

An audio system construction method according to one embodiment of this disclosure comprises acquiring device information of a speaker by communication between an information control device and a speaker, setting a name of the speaker, and assigning, at the information control device, the speaker to a channel that plays a specific role related to the name of the speaker in an audio system that handles a plurality of channels.

According to the one embodiment of this disclosure, user operations during the construction of an audio system can be reduced.

BRIEF DESCRIPTION OF THE DRAWINGS

FIG. 4 is a table in which IP addresses of speakers are associated with names of the speakers.

FIG. 5 is a table in which the names of the speakers are associated with channels.

DETAILED DESCRIPTION OF EMBODIMENTS

Selected embodiments will now be explained with reference to the drawings. It will be apparent to those skilled in the field from this disclosure that the following descriptions of the embodiments are provided for illustration only and not for the purpose of limiting the invention as defined by the appended claims and their equivalents.

Embodiments

An audio system 100 according to a first embodiment will be described with reference to FIG. 1.

Figure 1:
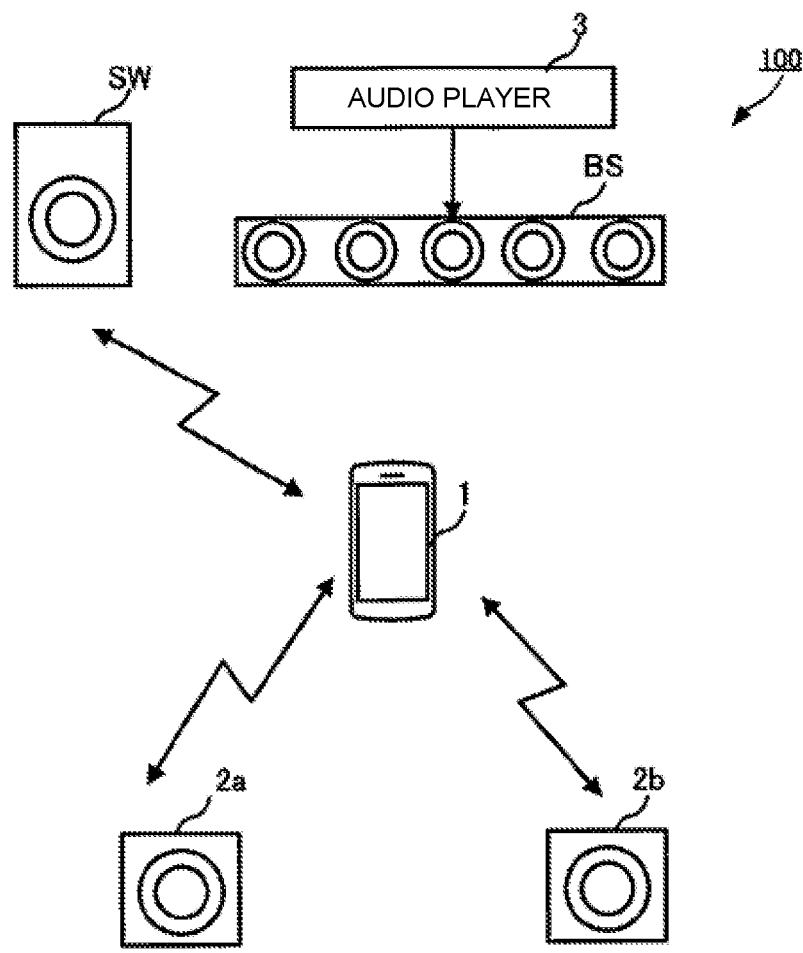
FIG. 1 is a block diagram illustrating a main configuration of an audio system.

FIG. 1 is a block diagram illustrating a main configuration of the audio system 100. The audio system 100 is a system that reproduces content (for example, musical pieces) including a plurality of channels. As shown in FIG. 1, the audio system 100 comprises a mobile terminal 1, a bar speaker BS, two surround speakers 2a, 2b (in the following description, referred to simply as speaker 2a, speaker 2b), a speaker SW (subwoofer), and an audio player 3.

The mobile terminal 1 assigns the channels for the speaker 2a, the speaker 2b, and the speaker SW, in accordance with the respective names of the speaker 2a, the speaker 2b, and the speaker SW. In addition, the mobile terminal 1 transmits the information of the channels assigned to the speaker 2a, the speaker 2b, and the speaker SW to the bar speaker BS, for example. The mobile terminal 1 referred to in this example is a portable mobile terminal, such as a smartphone or a laptop computer, and is an example of an information control device of this disclosure.

In this example, the audio system 100 is a 5.1 channel surround audio system, and the construction (setting) of the surround audio system will be described. The audio system 100 emits content reproduced by the audio player 3 from the bar speaker BS, the speaker 2a, the speaker 2b, and the speaker SW in a living room, for example. Here, the bar speaker BS emits, for example, L (Left) channel, R (Right) channel, and C (Center) channel audio signals in the audio system 100.

The audio player 3 transmits, for example, audio signals of the reproduced content to the bar speaker BS (master unit). The bar speaker BS transmits the received audio signals to each speaker for each channel wirelessly or by wire.

Figure 2:
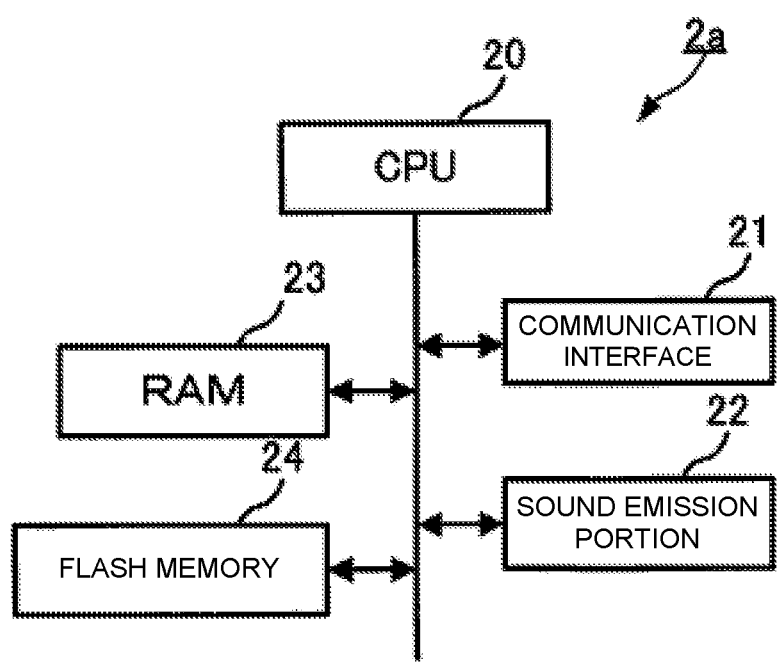
FIG. 2 is a block diagram illustrating a main configuration of a speaker.

The speaker 2a will be described with reference to FIG. 2. FIG. 2 is a block diagram illustrating a main configuration of the speaker 2a. The main configuration of the speaker 2b and of the speaker SW is the same as that of the speaker 2a, so that the speaker 2a will be described as representative.

As shown in FIG. 2, the speaker 2a comprises a CPU (Central Processing Unit) 20, a communication interface 21, a sound emission unit 22, a RAM (Random Access Memory) 23, and a flash memory 24.

The CPU 20 reads operating firmware stored in the flash memory 24 into the RAM 23 and integrally controls the speaker 2a.

The communication interface 21 is a hardware device capable of transmitting an analog or digital signal over the telephone, other communication wire, or wirelessly. In this embodiment, the communication interface 21 wirelessly transmits and receives various information to/from the mobile terminal 1. The communication interface 21 is a wireless communication interface, for example, complies with the Wi-Fi (registered trademark) standard. The communication interface 21 transmits device information to the mobile terminal 1, for example. In addition, the communication interface 21 is connected to a communication unit (not shown) of the bar speaker BS wirelessly or by wire.

The flash memory 24 stores device information. The device information includes role information and the IP address that is assigned at the time of network setting.

The role information in this example is information indicating a specific role. The speaker 2a and the speaker 2b have a plurality of pieces of role information. In the speaker 2a, "stereo L/R" and "surround L/R" are registered as role information. The same applies to the speaker 2b.

In addition, the speaker SW is used as a subwoofer, for example. Therefore, "subwoofer" is registered as the role information in the device information of the speaker SW.

The sound emission unit 22 emits audio signals transmitted from the bar speaker BS wirelessly or by wire. The sound emission unit 22 includes an amplifier that amplifies audio signals and a speaker driver that emits the amplified audio signals as sound.

The mobile terminal 1 will be described with reference to FIGS. 3, 4, 5, and 6. The mobile terminal 1 downloads a dedicated application program (hereinafter referred to as dedicated app) from a server in advance. By using the dedicated app in the mobile terminal 1, the user can easily carry out settings relating to the construction of the audio system 100.

Figure 3:
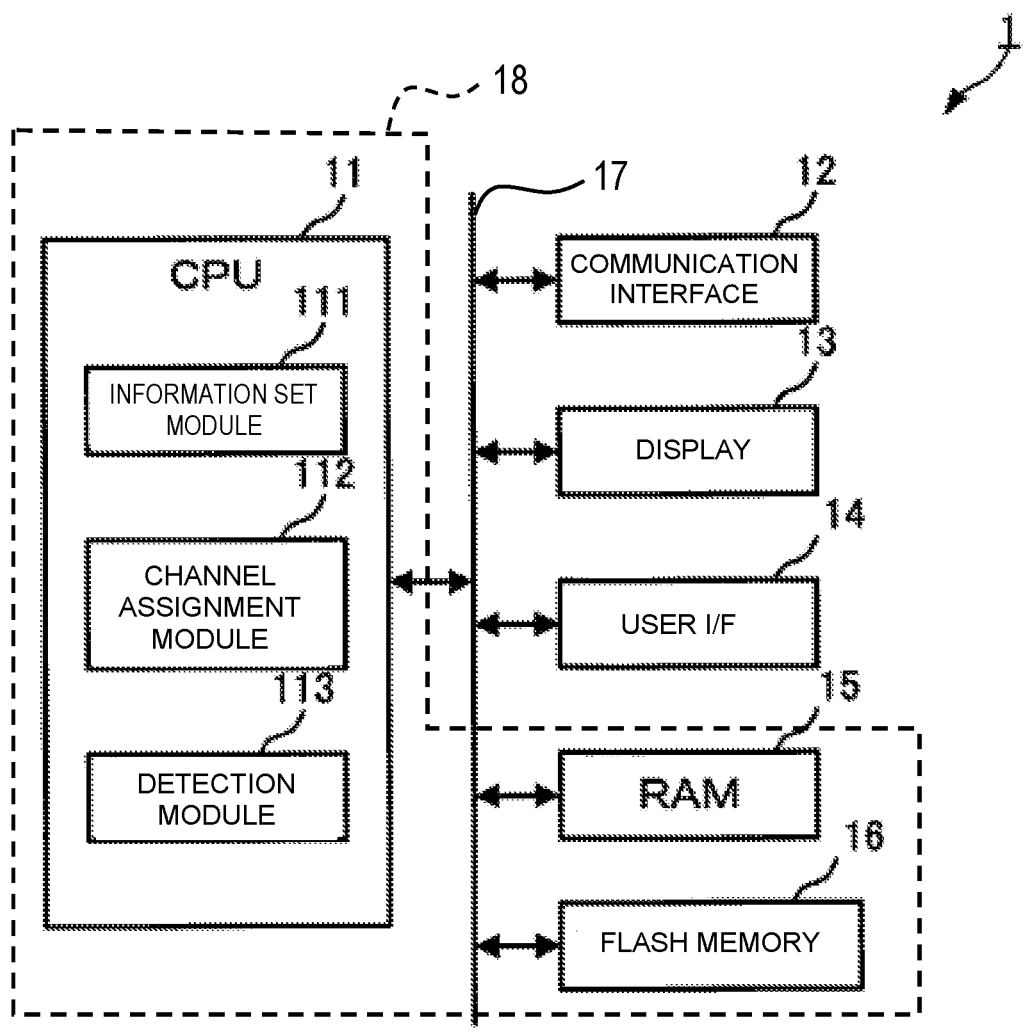
FIG. 3 is a block diagram illustrating a main configuration of a mobile terminal.
Figure 6:
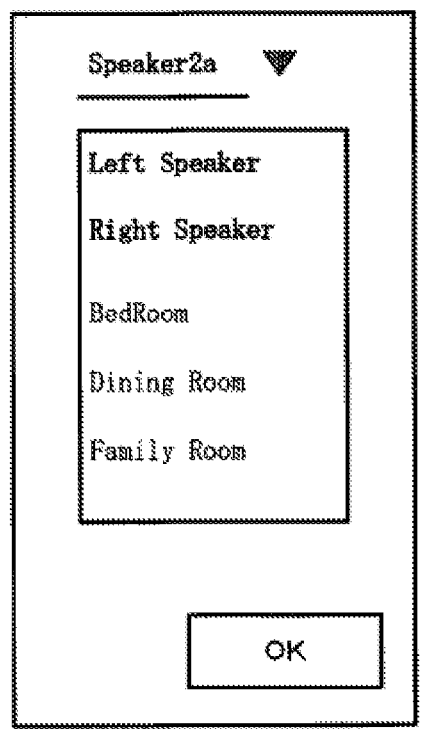
FIG. 6 is an explanatory diagram that shows one example of an information setting screen.

FIG. 3 is a block diagram illustrating the main configuration of the mobile terminal 1. FIG. 4 is a table in which the respective IP addresses of the speaker 2a, the speaker 2b, and the speaker SW are associated with names of the speaker 2a, the speaker 2b, and the speaker SW. FIG. 5 is a table in which the respective IP addresses of the speaker 2a, the speaker 2b, and the speaker SW are associated with names of the speaker 2a, the speaker 2b, and the speaker SW. FIG. 6 is an explanatory diagram that shows one example of an information setting screen.

The names in this example are names indicating specific roles of the speakers. For example, the name is selected from one or a plurality of name candidates by the user's operation. For example, "Left," "Left Speaker," "L" meaning left, "Right," "Right Speaker," "R" meaning right, etc., are registered in the mobile terminal 1 as name candidates based on the role information with respect to the speaker 2a and the speaker 2b.

As shown in FIG. 3, the mobile terminal 1 comprises a CPU (Central Processing Unit) 11 (e.g., a processor), a communication interface 12, a display 13, a user I/F (interface) 14, a RAM (Random Access Memory) 15, and a flash memory 16. The user I/F 14 is one example of a reception user interface of this disclosure. The CPU 11, the communication interface 12, the display 13, the user I/F 14, the RAM 15, and flash memory 16 are electrically connected to each other through an input/output interface or bus 17.

The CPU 11, the RAM 15, and the flash memory 16 form an electronic controller 18 of the mobile terminal 1. The electronic controller 18 can be a microcomputer that includes at least one processor and at least one computer storage device (i.e., computer memory devices). The electronic controller 18 can be formed of one or more semiconductor chips that are mounted on a circuit board. The term "electronic controller" as used herein refers to hardware that executes a software program, and does not include a human. As shown in FIG. 3, the CPU 11 of the electronic controller 11 executes a plurality of functions that include an information set module 111, a channel assignment module 112, and a detection module 113. The CPU 11 reads an application program and an operating OS (operating system) stored in the flash memory 16 into the RAM 15 and integrally controls the mobile terminal 1. The electronic controller 18 can be configured to comprise, instead of the CPU 11 or in addition to the CPU 11, programmable logic devices such as a DSP (Digital Signal Processor), an FPGA (Field Programmable Gate Array), and the like.

In addition, the CPU 11 reads a program related to the information setting process, a program related to the channel assignment process, and a program related to the detection process from the flash memory 16 into the RAM 15 to configure the information set module 111, the channel assignment module 112, and the detection module 113.

The detection module 113 detects the IP addresses respectively acquired by the bar speaker BS, the speaker 2a, the speaker 2b, and the speaker SW at the time that the bar speaker BS, the speaker 2a, the speaker 2b and the speaker SW connect to the network.

The information set module 111 acquires the IP addresses detected by the detection module 113. The communication interface 12 receives device information from the speaker 2a, the speaker 2b, and the speaker SW based on the IP addresses detected by the detection module 113. In addition, the information set module 111 acquires the role information from the device information received by the communication interface 12. The respective role information of the speaker 2a and the speaker 2b includes "stereo L/R" and "surround L/R." "Subwoofer" is included in the role information of the speaker SW. The mobile terminal 1 generates the name candidates such as "Left Speaker," "Right Speaker," and "Subwoofer" based on the role information.

The reception user I/F 14 has, for example, a touch panel (not shown). The display 13 displays a suitable screen based on control of the CPU 11. The user I/F 14 receives various user operations via a GUI (Graphical User Interface) composed of a touch panel stacked on the display 13. The reception user I/F 14 is not limited to the touch panel, and can be user operable input device(s) such as a button, a switch, a lever, and/or a dial. The RAM 15 is a computer storage device for temporarily storing data and for use as a work memory of the CPU 11. The flash memory 16 is a rewritable non-volatile storage device for storing control programs, etc., that are executed by the CPU 11. At least one of the RAM 15 or the flash memory 16, or both functions as a memory that stores the IP addresses of the speaker 2a, the speaker 2b, and the speaker SW, the names of the speaker 2a, the speaker 2b, and the speaker SW, and the channels in association with each other as discussed below. The electronic controller 18 can be configured to include, instead of the RAM 15 or the flash memory 16, or in addition to the RAM 15 and the flash memory 16, any computer storage device or any non-transitory computer-readable medium with the sole exception of a transitory, propagating signal. For example, the memory can include nonvolatile memory and volatile memory, and can be a ROM (Read Only Memory) device, a hard disk, etc.

The communication interface 12 is a hardware device capable of transmitting an analog or digital signal over the telephone, other communication wire, or wirelessly. In this embodiment, the communication interface 12 is a wireless communication interface, for example, that complies with the Wi-Fi (registered trademark) standard. The communication interface 12 receives the respective device information from, for example, the bar speaker BS, the speaker 2a, the speaker 2b, and the speaker SW.

The display 13 displays the information set screen when the CPU 11 sets a name for a detected speaker. The display 13 can be configured from, for example, a liquid-crystal panel (LCD) or a light-emitting diode (LED). In addition, as shown in FIG. 6, the display 13 displays a tab for each of the speaker 2a, the speaker 2b, and the speaker SW, and displays the respective name candidate on this tab, by the CPU 11. Specifically, the CPU 11 displays "Left Speaker" and "Right Speaker," which are the name candidates of the speaker 2a, on the information setting screen. In addition, the display 13 displays the channel assignment screen by the CPU 11. In this case, the display 13 displays the names of the speaker 2a, the speaker 2b, and the subwoofer to which the channels are assigned.

The information set module 111 sets the respective names of the speaker 2a, the speaker 2b, and the speaker SW selected from the name candidates by a user selection operation. The information set module 111 thereby stores the names of the speaker 2a, the speaker 2b, and the speaker SW in a memory (for example, the flash memory 16 or the RAM 15) associated with the IP addresses of the speaker 2a, the speaker 2b, and the speaker SW.

In the audio system 100 handling a plurality of channels, the channel assignment module 112 assigns each of the speaker 2a, the speaker 2b, and the speaker SW to a channel in charge of the specific role related to their respective names. That is, the channel assignment module 112 assigns an SL (Surround Left) channel to the speaker whose name set by the information set module 111 is "Left," "Left Speaker," or a name "L" related to the left, etc. In addition, the channel assignment module 112 assigns an SR (Surround Right) channel to the speaker whose set name is "Right," "Right Speaker," or a name "R" related to the right, etc. Furthermore, the channel assignment module 112 assigns the subwoofer channel to the speaker whose name set by the information set module 111 is "Subwoofer," the name "SW" related to the subwoofer, etc. As shown in FIG. 5, the channel assignment module 112 stores, in the memory (for example, the flash memory 16 or the RAM 15), the IP addresses of the speaker 2a, the speaker 2b, and the speaker SW, the names of the speaker 2a, the speaker 2b, and the speaker SW, and the channels in association with each other.

In addition, the mobile terminal 1 assigns channels not only to the speaker 2a, the speaker 2b, and the speaker SW, but also to the bar speaker BS as the main unit, for example.

Figure 7:
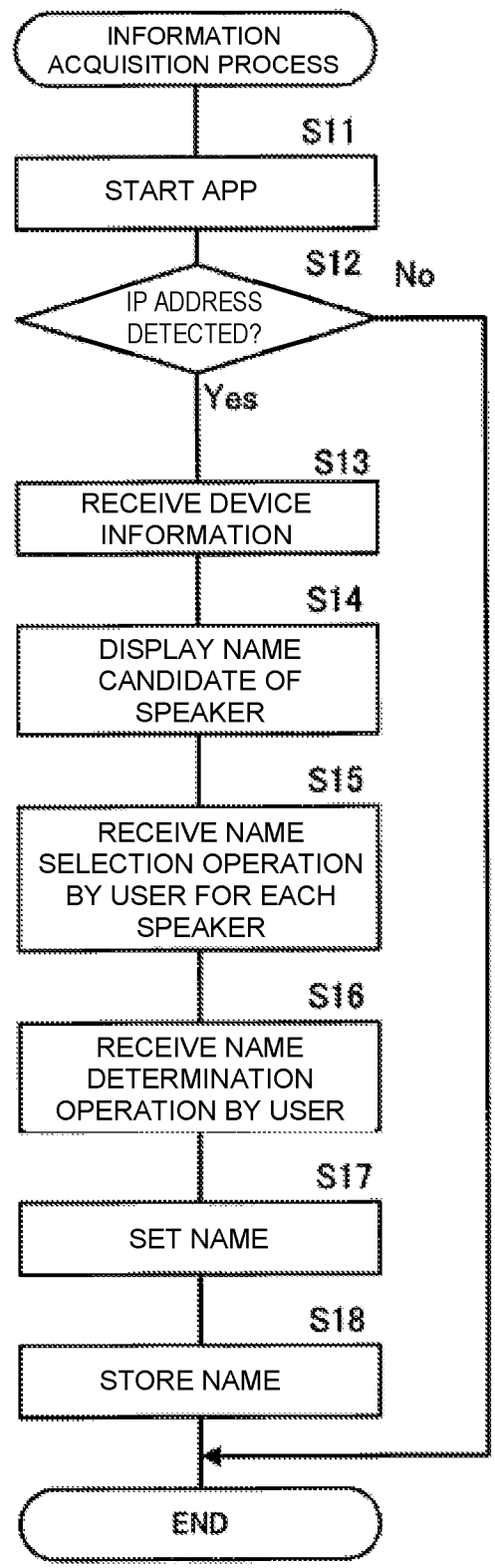
FIG. 7 is a flowchart illustrating one example of an information setting process of the mobile terminal.

One example of the information setting process of the mobile terminal 1 will be described with reference to FIG. 7. FIG. 7 is a flowchart illustrating one example of an information setting process of the mobile terminal 1. The user uses the dedicated app and carries out a setting to assign IP addresses when the bar speaker BS, the speaker 2a, the speaker 2b, and the speaker SW are connected to the network. The information setting process shown in FIG. 7 is the operation of the dedicated app, which is carried out after the IP addresses have already been assigned to the bar speaker BS, the speaker 2a, the speaker 2b, and the speaker SW. The following operation is one example, and no limitation is thereby imposed.

When the app is activated by the user (S11), the mobile terminal 1 displays the information setting screen. The mobile terminal 1 detects the already-assigned IP addresses of the bar speaker BS, the speaker 2a, the speaker 2b, and the speaker SW (S12). When the IP addresses of the bar speaker BS, the speaker 2a, the speaker 2b, and the speaker SW are detected (S12: Yes), the mobile terminal 1 receives the device information of the IP addresses of the speaker 2a, the speaker 2b, and the speaker SW (S13). The mobile terminal 1 generates name candidates based on the received role information of the speaker 2a, the speaker 2b, and the speaker SW by the dedicated app, and displays the generated name candidates on the display 13 (S14) (refer to FIG. 6). In this example, the mobile terminal 1 displays the tabs displaying the name candidates for each speaker.

The mobile terminal 1 receives, for each speaker, the name desired by the user selected from the name candidates by the user's selection operation (S15). When the user finishes selecting the names of all of the speaker 2a, the speaker 2b, and the speaker SW and presses an OK button shown in FIG. 6 (receives a decision operation) (S16), the mobile terminal 1 sets the names of the speaker 2a, the speaker 2b, and the speaker SW selected by the user (S17). The mobile terminal 1 stores the respective set names of the speaker 2a, the speaker 2b, and the speaker SW, in a memory (for example, the flash memory 16 or the RAM 15) associated with the IP addresses of the speaker 2a, the speaker 2b, and the speaker SW, as shown in FIG. 4 (S18).

In this example, the user selects the name "Left Speaker" for the speaker 2a. In addition, in this example, the user selects the name "Right Speaker" for the speaker 2b. Furthermore, the user selects the name "Subwoofer" for the speaker SW.

In this manner, the mobile terminal 1 sets (determines) the names from the respective name candidates of the speaker 2a, the speaker 2b, and the speaker SW by receiving user operations. The user can thereby set the names indicating the arrangement of the speaker 2a, the speaker 2b, and the speaker SW. In addition, by acquiring the respective role information of the speaker 2a, the speaker 2b, and the speaker SW, it becomes possible for the mobile terminal 1 to select the speaker 2a, the speaker 2b, and the speaker SW as devices that construct the surround audio system (audio system 100).

Figure 8:
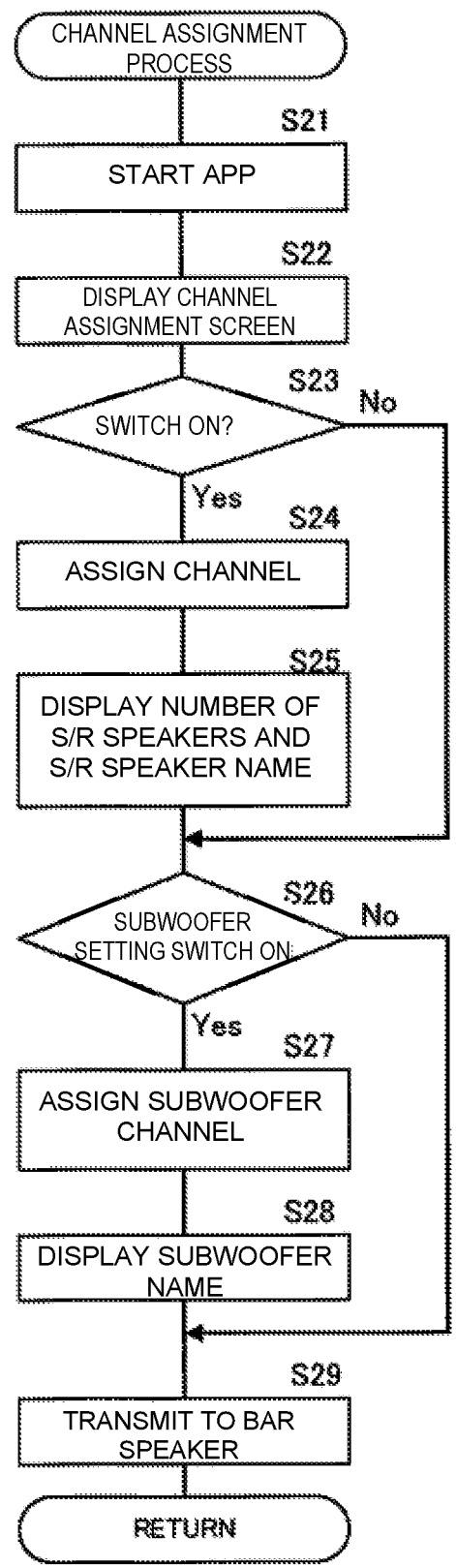
FIG. 8 is a flowchart illustrating one example of a channel assignment process.
Figure 9:
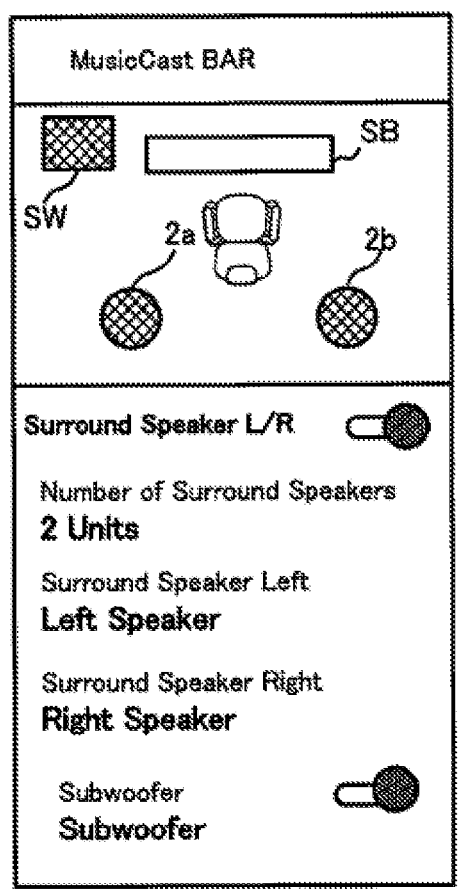
FIG. 9 is an explanatory diagram illustrating a channel assignment screen.

One example of the channel assignment process of the mobile terminal 1 will be described with reference to FIGS. 8 and 9. FIG. 8 is a flowchart illustrating one example of the channel assignment process of the mobile terminal 1. FIG. 9 is an explanatory diagram illustrating a channel assignment screen. The following operation is one example, and no limitation is thereby imposed.

The mobile terminal 1 activates the dedicated app (S21) and displays the channel assignment screen, as shown in FIG. 9 (S22). When a setting start switch of the surround audio system is turned on by the user (the circle next to the Surround Speaker L/R shown in FIG. 9 moved to the right end of the bar) (when initiation of a construction of the audio system 100 is instructed) (S23: Yes), the mobile terminal 1 assigns the channel corresponding to the names of the Left Speaker (speaker 2a) and Right Speaker (speaker 2b) (S24). After assigning the SL channel to the speaker 2a and the SR channel to the speaker 2b, the mobile terminal 1 displays the number of speakers to which the SL or the SR channel has been assigned below Number of Surround Speakers. The mobile terminal 1 displays "Left Speaker," which is the name of the speaker 2a to which the SL channel has been assigned, below Surround Speaker Left. The mobile terminal 1 displays "Right Speaker," which is the name of the speaker 2b to which the SR channel has been assigned, below Surround Speaker Right (S25) (refer to FIG. 9).

In addition, when the channel assignment switch of the subwoofer is turned on by the user (the circle next to the Subwoofer shown in FIG. 9 moved to the right end of the bar) (S26: Yes), the mobile terminal 1 assigns the subwoofer channel corresponding to the name to the speaker SW (S27). The mobile terminal 1 displays "Subwoofer," which is the name of the subwoofer (S28). The mobile terminal 1 transmits the channel information of the speaker 2a, the speaker 2b, and the speaker SW to the bar speaker BS (S29).

On the other hand, if the setting start switch of the surround audio system is in the off state (the circle next to the Surround Speaker L/R shown in FIG. 9 at the left end of the bar) (S23: No), the mobile terminal 1 causes the process to proceed to S26.

In addition, if the channel assignment switch of the subwoofer is in the off state (the circle next to Subwoofer shown in FIG. 9 at the left end of the bar) (S26: No), the mobile terminal 1 causes the process to proceed to S29.

The mobile terminal 1 assigns the channels, the FL, FR, and C channels, not only to the speaker 2a, the speaker 2b and the speaker SW, but also to the bar speaker BS, for example as the main unit.

In this manner, the mobile terminal 1 acquires the role information from the device information of the speaker 2a, the speaker 2b, and the speaker SW arranged in the space in which the audio system is constructed (in this example, the living room). The mobile terminal 1 assigns channels related to the acquired role information and the set names. For example, the mobile terminal 1 assigns the SL channel of the surround audio system to the speaker whose name is "Left Speaker" and whose role information is "Surround L/R." In this manner, by deciding on the name of the speaker in accordance with where it is to be installed, the user need not consider which speaker is to be assigned to which channel. Accordingly, the mobile terminal 1 can reduce the user operations during construction of the audio system 100.

An example of the assignment of the SL, SR, and subwoofer channels was described in this example, but no limitation is thereby imposed. If the audio system 100 is a surround audio system of 5.1 channels or more, the mobile terminal 1 can assign surround back and other channels.

In addition, the audio system 100 can use one speaker that combines the functions of SL and SR. In this case, when an audio system configured to use only one of these speaker is switched to an audio system configured to use two speakers by a user operation, the mobile terminal 1 is preferably configured to reassign channels to each of the speakers.

In addition, the audio system 100 is not limited to an example in which the content reproduced by the audio player 3 is emitted. For example, the audio system 100 can be used to emit content reproduced by the mobile terminal 1 or a television (not shown). That is, the audio player 3 is not an essential part of this disclosure. In this case the audio signal of the content possessed by the bar speaker BS is transmitted to each of the speaker 2a, the speaker 2b, and the speaker SW for each corresponding channel.

The names of the bar speaker BS, the speaker 2a, the speaker 2b, and the speaker SW are not limited to the foregoing. The names of the speaker 2a, the speaker 2b, and the speaker SW are not limited to English names and can be registered in a suitable language used by the user. The mobile terminal 1 has a larger storage capacity than the bar speaker BS, etc., which is an audio device, as well as a display that can display more information. Accordingly, in the present embodiment, the mobile terminal 1 makes possible the securing of a storage area necessary for holding a multilanguage table, which can be used to determine the language used by the user. The user can thereby use the dedicated app and easily set the optimum names to carry out the channel setting.

In addition, the mobile terminal 1 can be connected to the bar speaker BS, the speaker 2a, the speaker 2b, and the speaker SW by Bluetooth (registered trademark).

In addition, the mobile terminal 1 can receive the names of the speaker 2a, the speaker 2b, and the speaker SW by user input operations. In particular, at least one or more names set for at least one or more speakers 2a, 2b, SW can be changed by receiving a name input operation from the user at the mobile terminal 1. The mobile terminal 1 displays on the display 13 one or plurality of names among the names of the speaker 2a, the speaker 2b, and the speaker SW that have been set. Then, the mobile terminal 1 receives, from the user, the name input operation by the information setting screen. More specifically, the mobile terminal 1 receives a user selection for the one or plurality of names displayed on the display 13, and receives the name input operation for one or plurality of names selected by the user. That is, the user can change the names of the speakers to names more related to specific channels. The mobile terminal 1 assigns channels having specific roles in accordance with the names changed by the user input operations. The user can thereby give the desired names to the speakers. Accordingly, the mobile terminal 1 can more reliably assign channels to the speakers.

In addition, for example, when a channel is assigned in the audio system 100, the operation can be stopped if a speaker is already incorporated in another audio system.

In addition, upon determining that a speaker is already being used by a different audio system different from the audio system 100, or the name of the speaker to be associated to the speaker is not allowed to be set, the mobile terminal 1 assigns the speaker to a channel that plays a specific role by receiving a user operation. For example, there may be cases in which the set name of the speaker is a name that cannot be used in the surround audio system (for example, BedRoom) or cases in which the user inputs an erroneous name due to a spelling error, for example. In such cases, the mobile terminal 1 can display on the display 13 a screen in which the speaker's name can be reentered or a screen in which a channel can be manually assigned to a speaker, for example.

In this manner, when a speaker could not be assigned to a channel having a specific role at the time of channel assignment, the mobile terminal 1 can stop the process or switch screens and continue the process.

Modified Example 1

Figure 10:
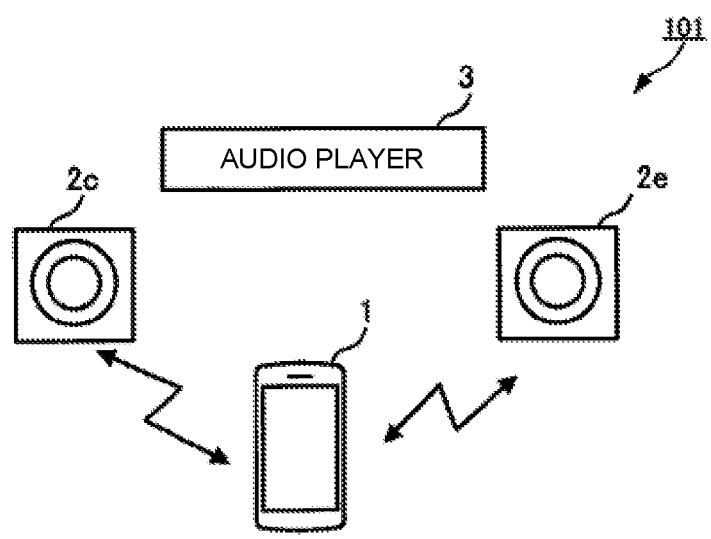
FIG. 10 is a block diagram illustrating a main configuration of an audio system according to Modified Example 1.

An audio system 101 according to Modified Example 1 will be described with reference to FIGS. 10 and 11. FIG. 10 is a block diagram illustrating a main configuration of the audio system 101 according to Modified Example 1. Components that are the same as those of the mobile terminal 1 and the speakers 2a, 2b of the first embodiment have been assigned the same reference symbols, and their descriptions have been omitted.

The audio system 101 in this example is a stereo audio system. As shown in FIG. 10, the audio system 101 has a master speaker and a paired speaker, which are paired with each other. In the audio system 101, the mobile terminal 1 assigns two channels (first channel and second channel) one-to-one to the master speaker and the paired speaker, which are paired with each other. The first channel and the second channel in this example are either the L channel or the R channel. In addition, the master speaker in this example corresponds to the first speaker (speaker) of this disclosure. In addition, the paired speaker in this example corresponds to the second speaker (additional speaker) of this disclosure.

In this example as well, the audio signal of the content reproduced by the audio player 3 is transmitted to the master speaker. The master speaker separates the received audio signal into the L channel and the R channel and transmits the audio signal of one channel to the paired speaker.

The mobile terminal 1 first sets the master speaker and the paired speaker. More specifically, the mobile terminal 1 sets the position of the master speaker to the "left side" of the user in advance, for example. That is, the master speaker is the speaker (speaker 2c in FIG. 10) placed on the left side of the user, having the name (name candidate) "left," "Left Speaker," "L" related to the left, etc. In this case, the paired speaker automatically becomes the speaker placed on the right side (speaker 2e in FIG. 10). That is, the paired speaker is the speaker having the name (name candidate) "right," "Right Speaker," "R" related to the right, etc.

The user sets the name of speaker 2c to "Left Speaker" in the information setting screen. In addition, the user sets the name of the speaker 2e to "Right Speaker" in the information setting screen.

The channel assignment module 112 assigns the channels related to the acquired role information and the set names of the speaker 2c and the speaker 2e. The channel assignment module 112 assigns the L channel in accordance with "stereo L/R," which is the role information, and "Left Speaker," which is the name of the speaker 2c. In addition, the channel assignment module 112 assigns the R channel in accordance with "stereo L/R" which is the role information and "Right Speaker" which is the name of the speaker 2e.

Figure 11:
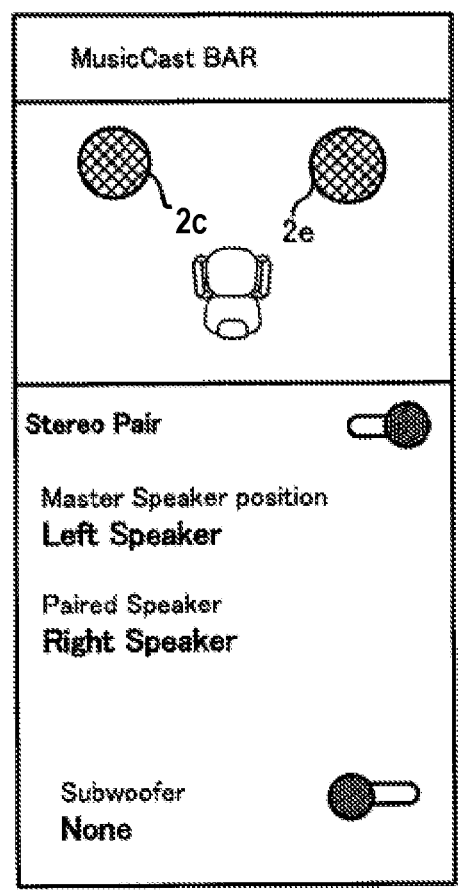
FIG. 11 is an explanatory diagram illustrating a channel assignment screen according to the Modified Example 1.

As shown in FIG. 11, the display 13 of the mobile terminal 1 receives the selection of Master Speaker position by the CPU 11, when the channel assignment switch for Stereo Pair is turned on by the user's operation. If the user selects the "left side" for the Master Speaker position, the channel assignment module 112 sets the speaker 2c to the L channel master speaker in accordance with "Left Speaker," which is the name of the speaker 2c. The mobile terminal 1 sets the remaining speaker 2e to the R channel Paired speaker. The mobile terminal 1 displays "Left Speaker," which is the name of the speaker 2c to which the L channel has been assigned, below Master Speaker position. In addition, the mobile terminal 1 displays "Right Speaker," which is the name of the speaker 2e to which the R channel has been assigned, below Paired Speaker.

In addition, in this example, since a name related to the subwoofer is not set, the mobile terminal 1 sets the subwoofer to the off state (the circle is on the left side of the bar). In this case, the display 13 displays "None" below Subwoofer by the CPU 11.

In this manner, when constructing the stereo audio system, the mobile terminal 1 determines the master speaker and the paired speaker from the preset names, and assigns the channel having a specific role to each of the master speaker and the paired speaker, simply by the user selecting right or left for the master speaker. The user can simply set the names of the speaker 2c and the speaker 2e without considering channel assignment for the speaker 2c and the speaker 2e. The mobile terminal 1 can thereby reduce user operations during construction of the audio system.

In this example, the channel assignment module 112 of the mobile terminal 1 sets the position of the master speaker to the left side of the user in advance, and assigns the L channel to the speaker that becomes this master speaker, but no limitation is thereby imposed. The mobile terminal 1 can set the position of the master speaker to the right side of the user in advance and assign the R channel to the speaker that becomes this master speaker.

Modified Example 2

Figure 12:
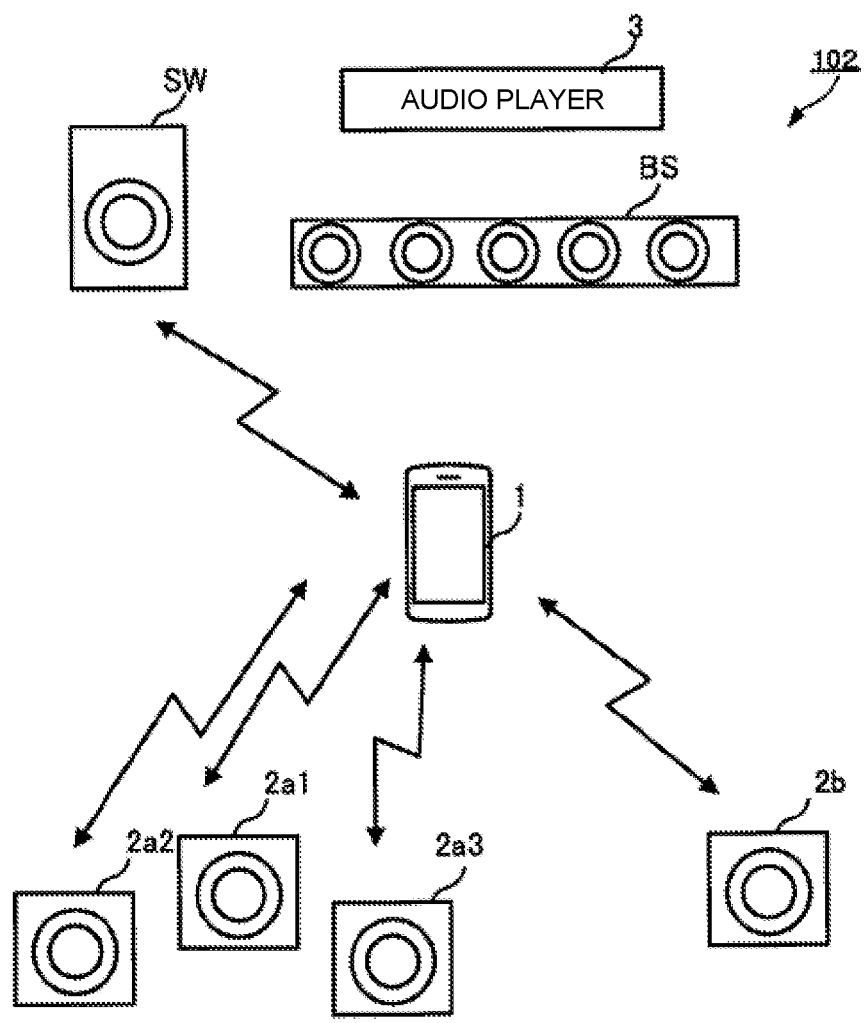
FIG. 12 is a block diagram illustrating a main configuration of an audio system according to Modified Example 2.

An audio system 102 according to Modified Example 2 will be described with reference to FIG. 12. FIG. 12 is a block diagram illustrating a main configuration of the audio system 102. Components that are the same as those of the audio system described above have been assigned the same reference symbols, and their descriptions have been omitted.

The audio system 102 of Modified Example 2 comprises the mobile terminal 1, the bar speaker BS, four surround speakers 2a1, 2a2, 2a3, 2b (in the following description, simply referred to as speaker 2a1, speaker 2a2, speaker 2a3, speaker 2b), the speaker SW (subwoofer), and the audio player 3.

In this example, since the speaker 2a1, the speaker 2a2, and the speaker 2a3 are all speakers to be placed on the left side of the user, the respective names thereof are set to "L," "Left Speaker," and "Left". That is, each of speaker 2a1, speaker 2a2, and speaker 2a3 has a name that can be assigned to the SL channel in the surround audio system.

Of the speaker 2a1, the speaker 2a2, and the speaker 2a3, which can be assigned to the SL channel, the mobile terminal 1 assigns the speaker for which the device information is acquired first.

In this manner, if there are a plurality of speakers that can be assigned to a prescribed channel, the audio system 102 automatically selects one of the speakers and assigns the desired channel. Accordingly, even if there is a plurality of speakers that have the same role, the user does not need to set one speaker from among the plurality of speakers. The mobile terminal 1 can thereby reduce the user operations during construction of the audio system.

The mobile terminal 1 can determine priority in accordance with the frequency of use or the user operation in advance, and assign the name of the speaker with a high priority to the corresponding channel.

In addition, the mobile terminal 1 can automatically determine the priority in accordance with the set name. For example, the name "Surround L" is given the highest priority. The name "Front L" is given a low priority. In addition, the mobile terminal 1 can learn the relationship between the names and the channels. For example, the mobile terminal 1 accesses a database indicating the relationship between the names and the channels. The database is constructed by receiving information indicating the relationship between the set names and the channels from a large number of users. The mobile terminal 1 accesses the database and learns the relationship between the names and the corresponding channels. When the names are set after learning, the mobile terminal 1 can assign the corresponding channels with high precision.

The description of the present embodiment is exemplary in all respects and should not be considered restrictive. The scope of the present invention is indicated by the Claims section, not the embodiment described above. Furthermore, the scope of the present invention is intended to include the scope that is equivalent that of the Claims, as well as all modifications that are within the scope.

What is claimed is:

1. An audio system construction method comprising:
   acquiring device information of a speaker by communication between an information control device and the speaker;
   setting a name of the speaker; and
   assigning the speaker, at the information control device, to a channel that plays a specific role related to the name of the speaker in an audio system that handles a plurality of channels, wherein
   the acquiring of the device information of the speaker includes acquiring device information of each of a plurality of speakers including the speaker, by communication between the information control device and the plurality of speakers,
   the setting of the name of the speaker includes setting a plurality of names for the plurality of the speakers, respectively, and
   the assigning of the speaker to the channel includes, among a plurality of pieces of device information that have been acquired and are assignable to a prescribed channel, assigning to the prescribed channel one of the plurality of speakers for which device information is received first.

2. The audio system construction method according to claim 1, wherein
   the setting of the name of each of the speakers is performed at the information control device by displaying at least one candidate of the name of each of the speakers based on the device information of each of the speakers, and receiving a selection of the name of each of the speakers from the at least one candidate of the name of each of the speakers by a user operation.

3. The audio system construction method according to claim 1, further comprising
   changing the name of the speaker by receiving a name input operation from a user at the information control device, wherein
   the assigning of the speaker to the channel playing the specific role is performed based on the name that has been changed.

4. The audio system construction method according to claim 1, wherein
   the acquiring of the device information of the speaker includes acquiring a first device information of a first speaker by communication between the information control device and the first speaker and acquiring a second device information of a second speaker by communication between the information control device and the second speaker,
   the setting of the name of the speaker includes setting a first name of the first speaker and setting of a second name of the second speaker,
   the plurality of channels includes a first channel and a second channel, and
   the assigning of the speaker to the channel includes assigning the second speaker to the second channel in response to the first speaker being assigned to the first channel at the information control device.

5. The audio system construction method according to claim 1, wherein
   the assigning of the speaker to the channel playing the specific role is performed at the information control device in response to instruction for initiation of a construction of the audio system.

6. An audio system construction method comprising:
   acquiring device information of a speaker by communication between an information control device and the speaker;
   setting a name of the speaker; and
   assigning the speaker, at the information control device, to a channel that plays a specific role related to the name of the speaker in an audio system that handles a plurality of channels, wherein
   upon determining the speaker is already being used by a different audio system different from the audio system, or the name to be associated to the speaker is not allowed to be set, the assigning is performed at the information control device by receiving a user operation.

7. The audio system construction method according to claim 6, wherein
   the setting of the name of the speaker is performed at the information control device by displaying at least one candidate of the name based on the device information, and receiving a selection of the name of the speaker from the at least one candidate of the name by the user operation.

8. The audio system construction method according to claim 6, further comprising
   changing the name of the speaker by receiving a name input operation from a user at the information control device, wherein
   the assigning of the speaker to the channel is performed based on the name that has been changed.

9. The audio system construction method according to claim 6, wherein
   the acquiring of the device information of the speaker includes acquiring a first device information of a first speaker by communication between the information control device and the first speaker and acquiring a second device information of a second speaker by communication between the information control device and the second speaker,
   the setting of the name of the speaker includes setting a first name of the first speaker and setting of a second name of the second speaker,
   the plurality of channels includes a first channel and a second channel, and
   the assigning of the speaker to the channel includes assigning the second speaker to the second channel in response to the first speaker being assigned to the first channel at the information control device.

10. The audio system construction method according to claim 6, wherein
    the assigning of the speaker to the channel is performed at the information control device in response to instruction for initiation of a construction of the audio system.

11. An information control device comprising:
    a communication interface configured to communicate with a speaker; and
    an electronic controller having a processor configured to
    acquire device information of the speaker received via the communication interface,
    set a name of the speaker; and
    assign the speaker to a channel that plays a specific role related to the name of the speaker in an audio system that handles a plurality of channels, wherein the communication interface is configured to communicate with a plurality of speakers including the speaker, the processor is configured to acquire device information of each of the plurality of speakers received via the communication interface and set a plurality of names of the plurality of speakers, respectively, and among a plurality of pieces of device information that have been acquired and are assignable to a prescribed channel, the processor is configured to assign to the prescribed channel one of the plurality of speakers for which the device information is received first.

12. The information control device according to claim 11, further comprising a reception user interface configured to receive a user input operation of the name of each of the speakers, wherein the reception user interface is further configured to display at least one candidate of the name of each of the speakers based on the device information of each of the speakers, and receive a selection of the name of each of the speakers from the at least one candidate of the name of each of the speakers by the user input operation, and the processor is configured to set the name from the selection received by the reception user interface.

13. The information control device according to claim 11, wherein the plurality of speakers includes a first speaker and a second speaker, the plurality of channels includes a first channel and a second channel, and the processor is configured to assign the second speaker to the second channel in response to assigning the first speaker to the first channel.

14. The information control device according to claim 11, wherein the processor is configured to assign the speaker to the channel playing the specific role in response to instruction for initiation of a construction of the audio system.

15. An audio system comprising:

the information control device according to claim 11; and the plurality of speakers configured to send information to and receive information from the information control device via a network.

16. An information control device comprising:

a communication interface configured to communicate with a speaker; and an electronic controller having a processor configured to acquire device information of the speaker received via the communication interface, set a name of the speaker;

assign the speaker to a channel that plays a specific role related to the name of the speaker in an audio system that handles a plurality of channels; and a reception user interface configured to receive a user input operation of the name, wherein upon determination that the speaker is already being used by a different audio system different from the audio system, or the name to be associated to the speaker is not allowed to be set, the processor is configured to assign the speaker to the channel that plays the specific role by receiving the user input operation.

17. The information control device according to claim 16, wherein the reception user interface is further configured to display at least one candidate of the name based on the device information, and receive a selection of the name of the speaker from the at least one candidate of the name by the user input operation, and the processor is configured to set the name from the selection received by the reception user interface.

18. The information control device according to claim 16, wherein the communication interface is further configured to communicate with an additional speaker, the processor is further configured to acquire additional device information of the additional speaker received via the communication interface and set a name of the additional speaker, the plurality of channels includes a first channel and a second channel, and the processor is configured to assign the additional speaker to the second channel in response to assigning the speaker to the first channel.

19. The information control device according to claim 16, wherein the processor is configured to assign the speaker to the channel playing the specific role in response to instruction for initiation of a construction of the audio system.

20. An audio system comprising:

the information control device according to claim 16; and one or a plurality of speakers configured to send information to and receive information from the information control device via a network.

* * * * *